March 2, 1954  F. G. BURG  2,670,636
MACHINE TOOL OF THE DRILL PRESS TYPE
HAVING MULTIPLE ROTARY TOOLS
Filed June 10, 1948  9 Sheets-Sheet 1
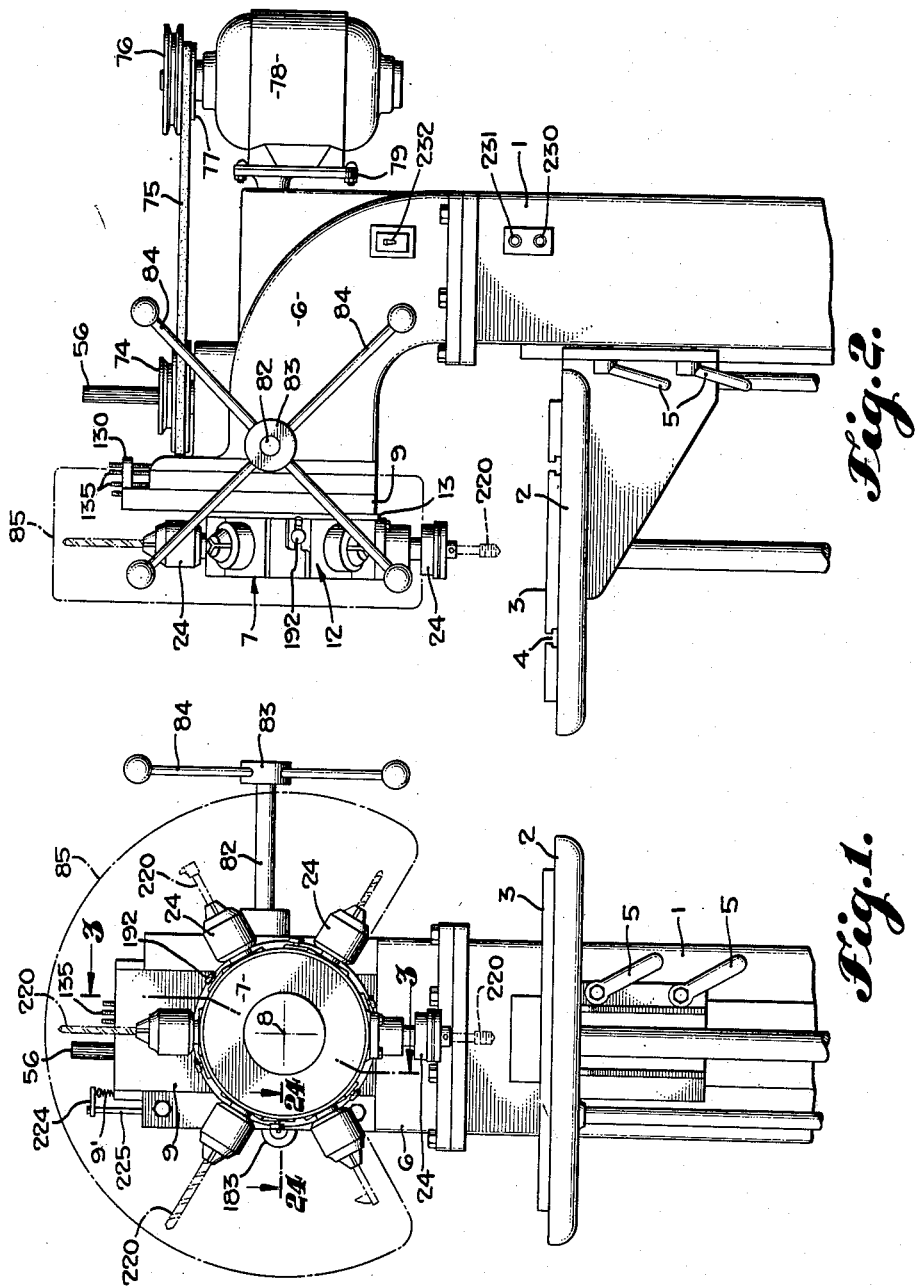
FRED G. BURG,
INVENTOR.
BY John Flam
ATTORNEY March 2, 1954

F. G. BURG 2,670,636

MACHINE TOOL OF THE DRILL PRESS TYPE
HAVING MULTIPLE ROTARY TOOLS

Filed June 10, 1948

FRED G. BURG,
INVENTOR.

BY John Flann

ATTORNEY

March 2, 1954 F. G. BURG 2,670,636
MACHINE TOOL OF THE DRILL PRESS TYPE
HAVING MULTIPLE ROTARY TOOLS
Filed June 10, 1948 9 Sheets-Sheet 3
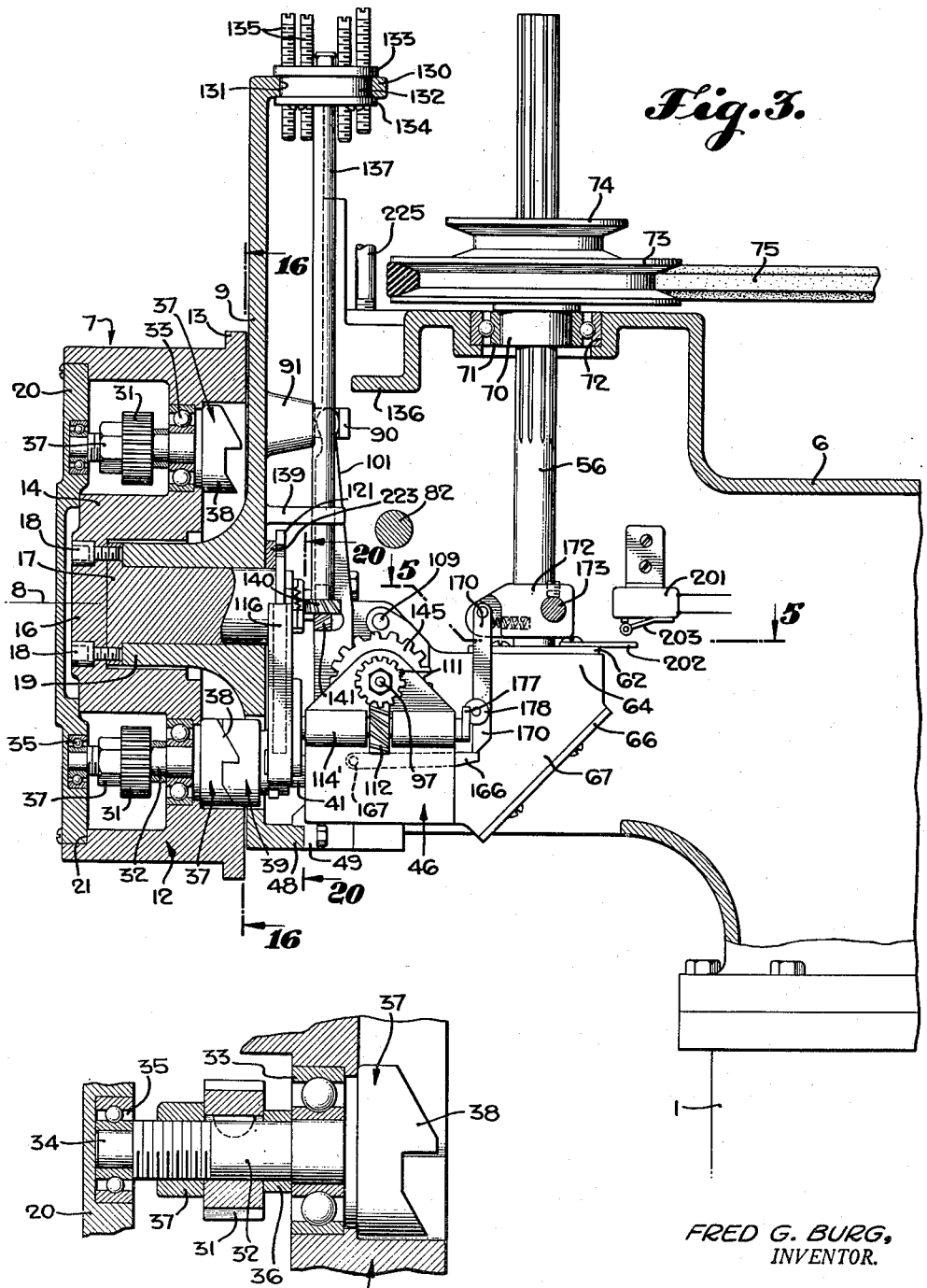
FRED G. BURG,
INVENTOR.
BY John F Lam
ATTORNEY

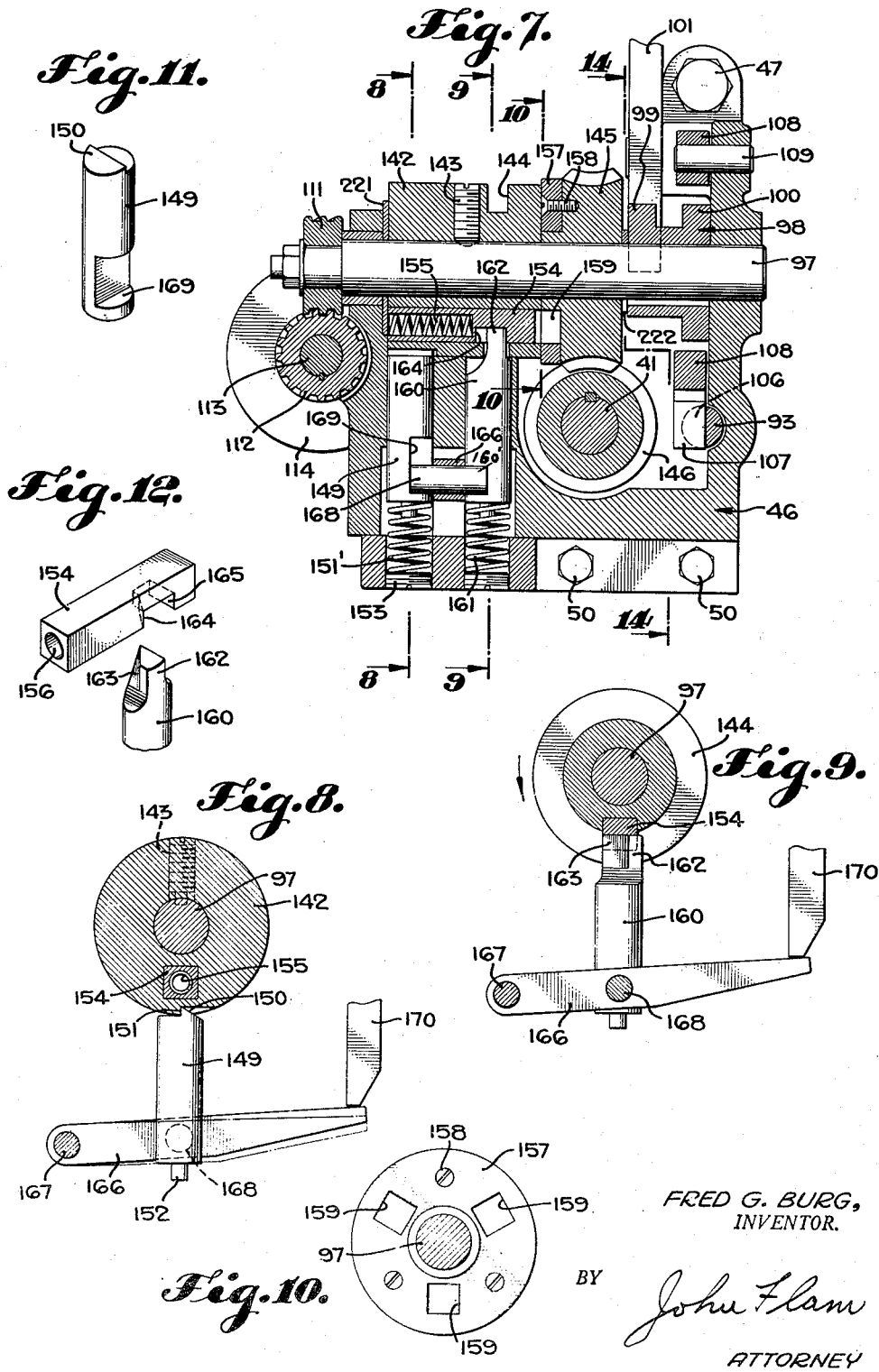

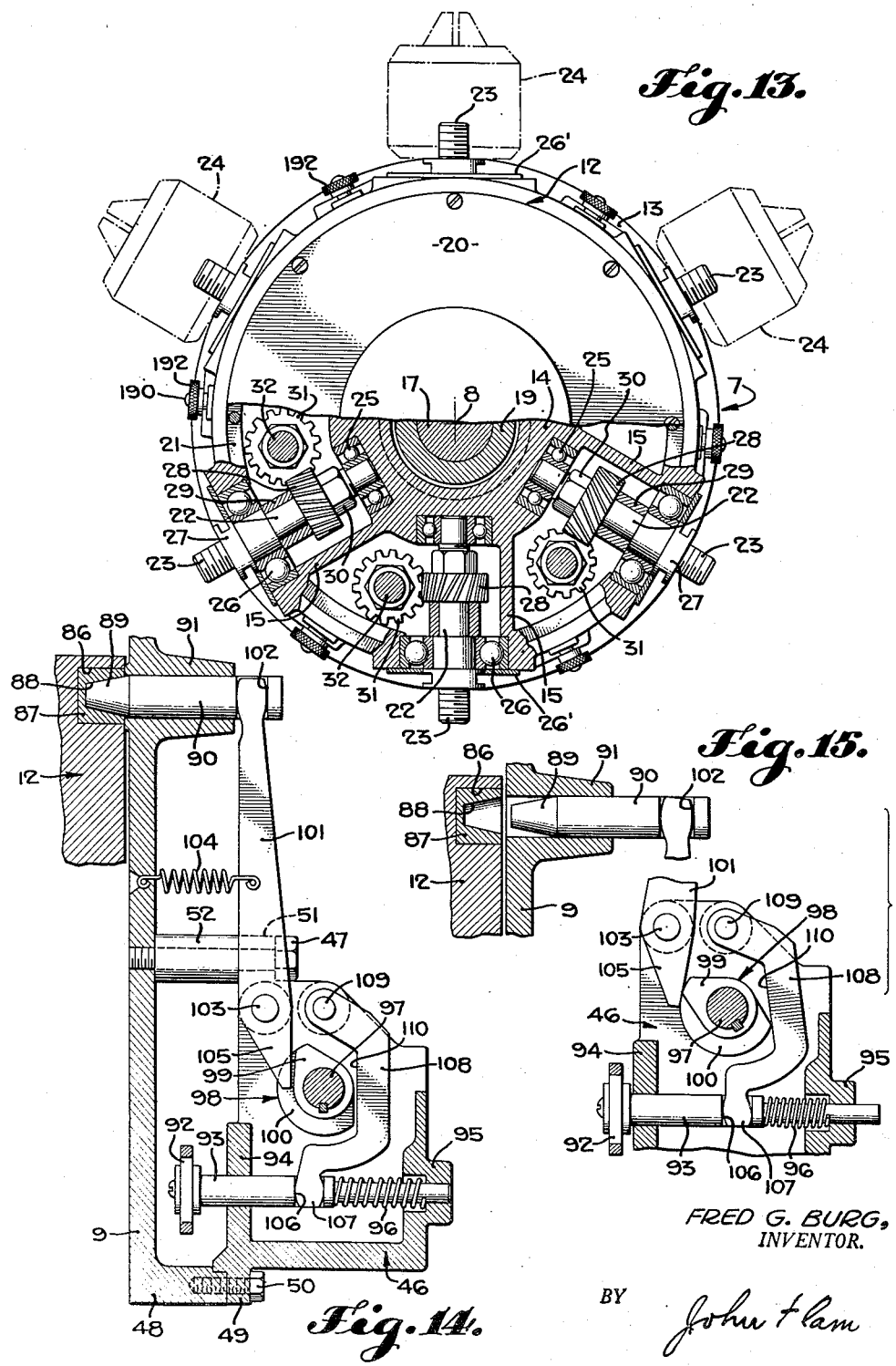

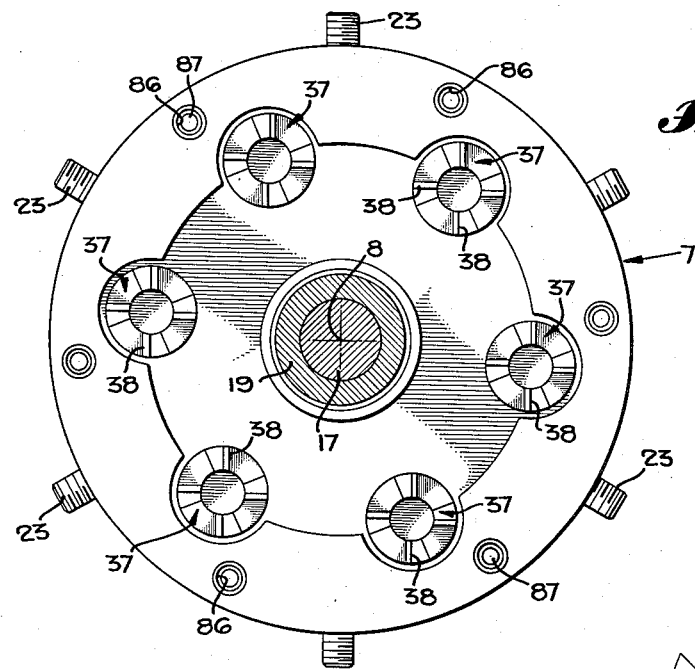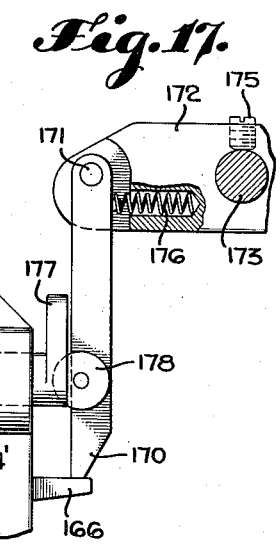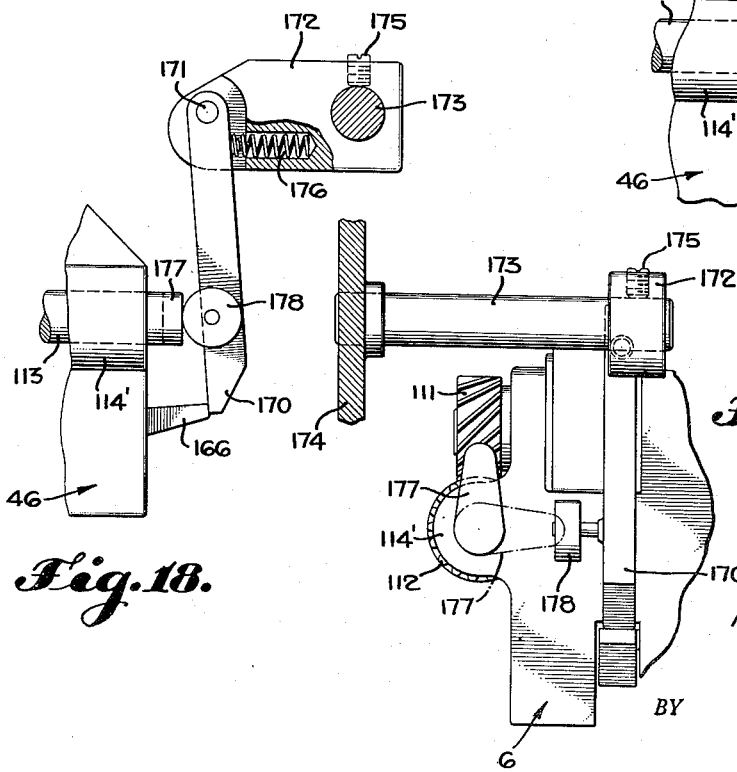

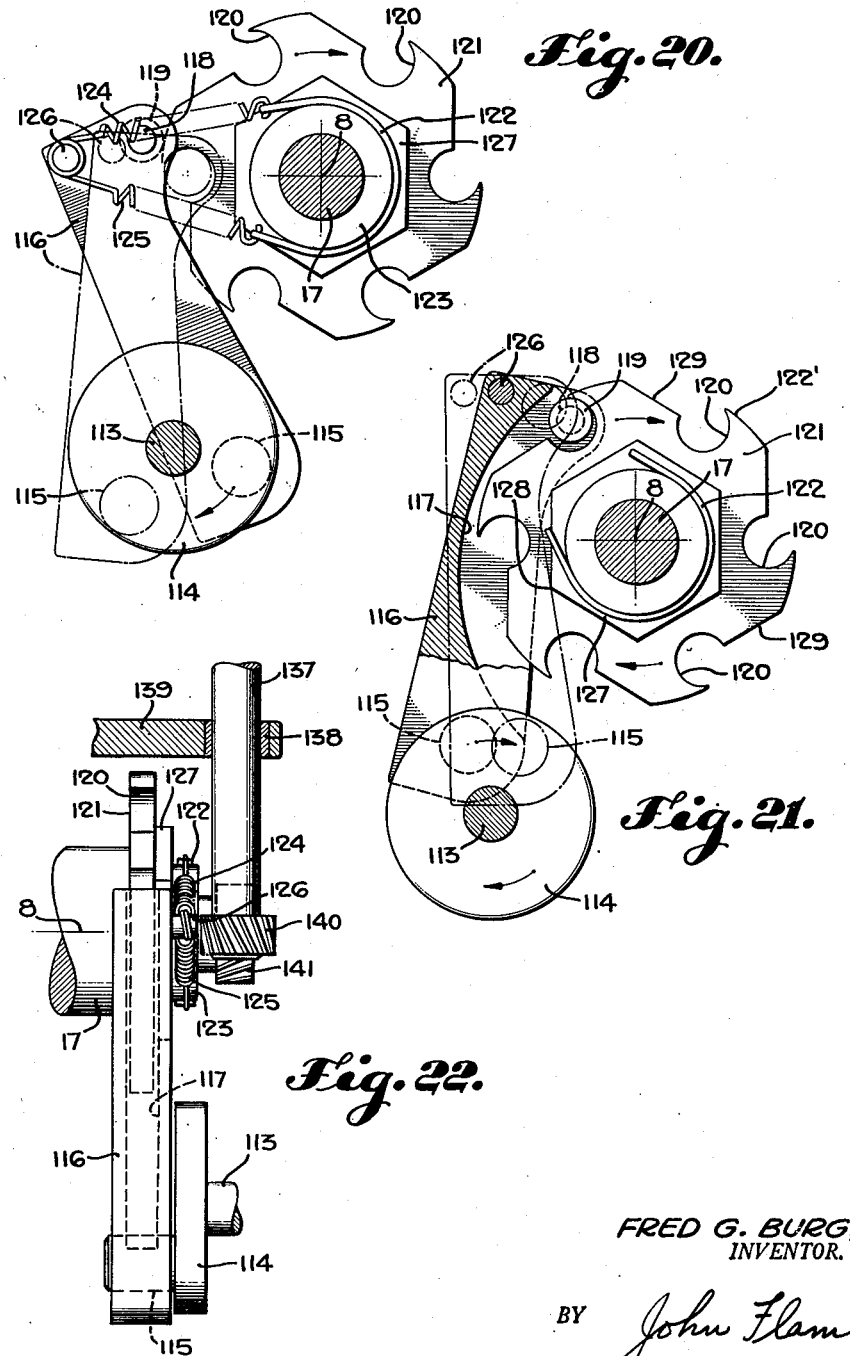

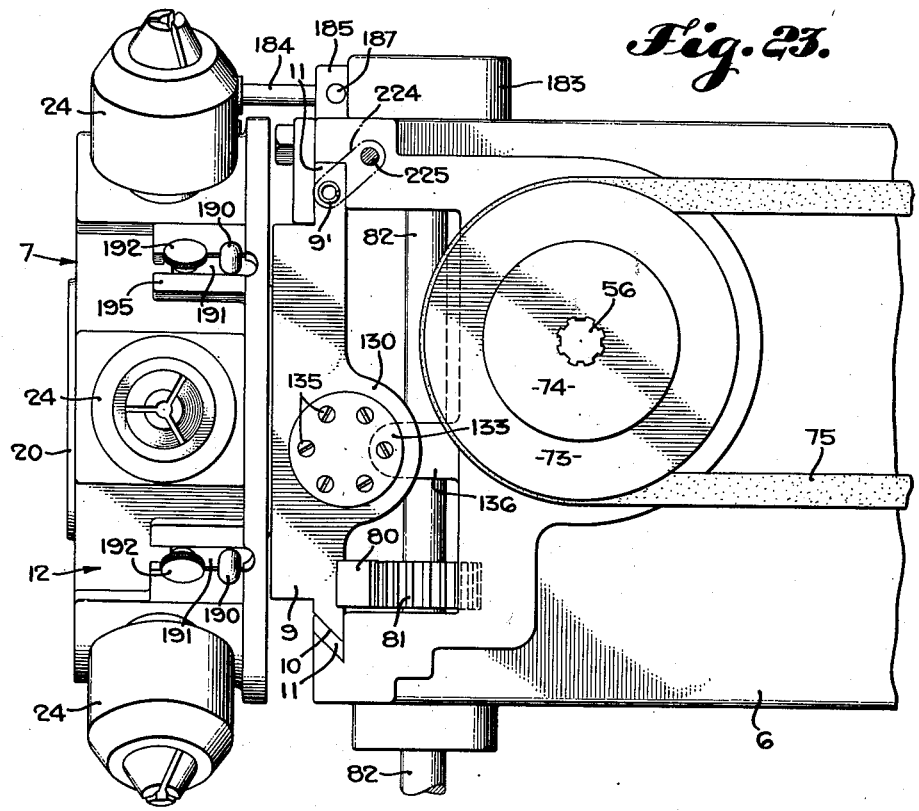
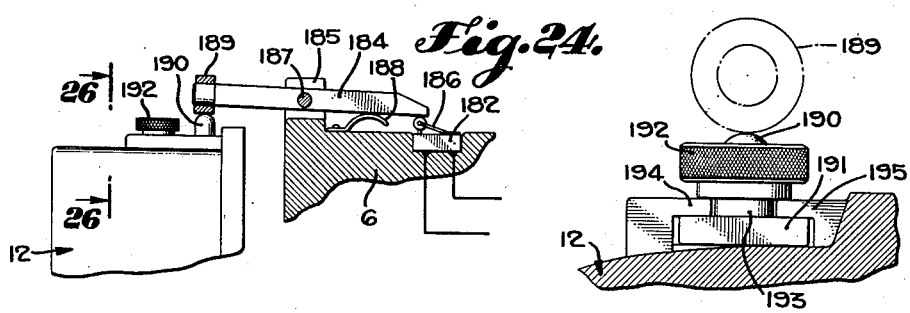
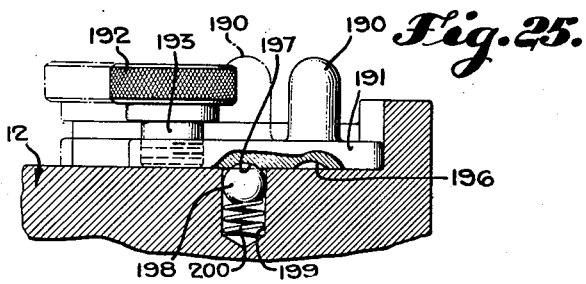
FRED G. BURG, INVENTOR.

March 2, 1954

F. G. BURG 2,670,636

MACHINE TOOL OF THE DRILL PRESS TYPE HAVING MULTIPLE ROTARY TOOLS

Filed June 10, 1948

FRED G. BURG,
INVENTOR.

BY John Flam
ATTORNEY

Patented Mar. 2, 1954

2,670,636

UNITED STATES PATENT OFFICE 2,670,636

MACHINE TOOL OF THE DRILL PRESS TYPE HAVING MULTIPLE ROTARY TOOLS

Fred G. Burg, Los Angeles, Calif.

Application June 10, 1948, Serial No. 32,198

19 Claims. (Cl. 77—25)

This invention relates to a machine tool, adapted to perform drilling, tapping or reaming operations, or analogous use. More particularly, it relates to a tool of this type in which a plurality of rotary tools may be used successively upon the work.

In many forms of work a number of operations including drilling, reaming or tapping must be performed. For example, a hole may be drilled, and then tapped or reamed; or else a number of holes of different sizes are to be drilled in the work. It is apparent, also, that the speed of rotation of the tool must be selected to suit the work and the specific tool used.

In the common form of drill press, having a single tool, chuck or holder, such successive operations are time consuming, since the tool must be changed for each different operation; often the speed of operation must also be changed.

It is one of the objects of this invention to provide a machine tool that greatly facilitates such successive operations. More particularly, the invention makes it possible to bring a number of previously mounted rotary tools (drills, reamers, taps, etc.) successively into cooperative relation with the work, in an automatic manner.

In order to accomplish these results, a head is provided carrying a number of chucks or tool holders, each accommodating a specific rotary tool; only one of the tools however is in operating position and coupled to a source of rotary motion. The head can then be advanced toward the work to perform a drilling, reaming, or tapping operation. The act of urging the tool head toward its initial or starting position automatically causes adjustment of the head to place the next tool into operative position.

It is accordingly another object of this invention to provide a mechanism of this character.

It is still another object of this invention to make it possible readily to predetermine independently the rates at which each of the tools is to be rotated.

It is still another object of this invention to make it possible to predetermine the limit of travel of the tool toward the work, whereby a definite depth of hole, or of the threads in a tap, may be obtained.

It is convenient to provide angular or rotary motion for the head that carries the tool. Movement of the head, occurring at the conclusion of each operation and withdrawal of the head, occurs always in the same direction of rotation. In this way, any number of cycles of tool operations occur in natural sequence as the head is intermittently angularly adjusted.

It is accordingly still another object of this invention to provide a tool in which the multiple tool head is readily positionable for each operation in sequence, in a simple and efficient manner. This positioning operation may however be omitted, if desired, so that the same tool may be used in succession before a change is made.

It is still another object of this invention to ensure that the tool head will be rotated always at the same rate during the process of angular adjustment.

In order to make it possible to move the head angularly, the source of motion for the tools must be temporarily disconnected. The head is necessarily locked during the operation of the tool, against angular movement. It is accordingly another object of this invention to provide for unlocking the head and for unclutching the tool from the motor prior to angular adjustment of the head, and for subsequently locking the head and connecting the clutch.

It is still another object of this invention to perform these acts automatically upon retraction of the tool to a definite inactive position away from the work, and to ensure accurate registry of the head after it has been angularly adjusted.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

Referring to the drawings:

Figure 1 is a front view of a drilling machine embodying the invention;

Fig. 2 is a side view thereof;

Fig. 3 is an enlarged sectional view, taken along a plane corresponding to line 3—3 of Fig. 1;

Fig. 4 is an enlarged detail section of a coupling member carried by the head structure;

Fig. 7 is a sectional view, taken along a plane corresponding to line 7—7 of Fig. 6;

Figs. 8, 9, and 10 are sectional views, taken along planes corresponding to lines 8—8, 9—9, and 10—10 of Fig. 7;

Fig. 11 is a pictorial view of one of the pins utilized in connection with the mechanism;

Fig. 12 is a pictorial view showing the elements that perform the clutching and unclutching of the mechanism for performing the operation of angularly adjusting the head of the machine.

Figure 5:
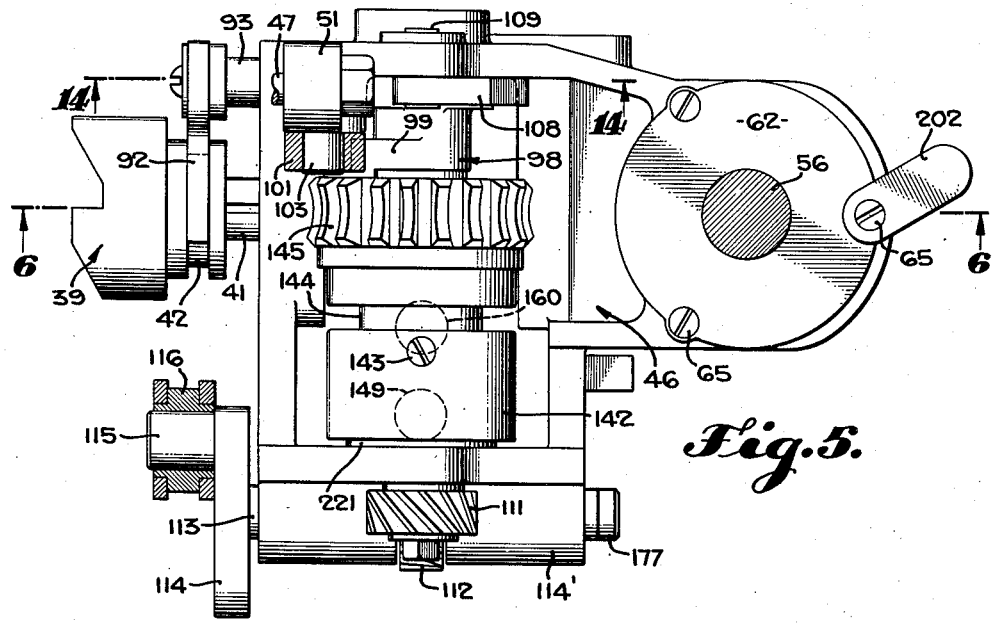
Fig. 5 is an enlarged sectional view, taken along a plane corresponding to line 5—5 of Fig. 3.
Figure 27:
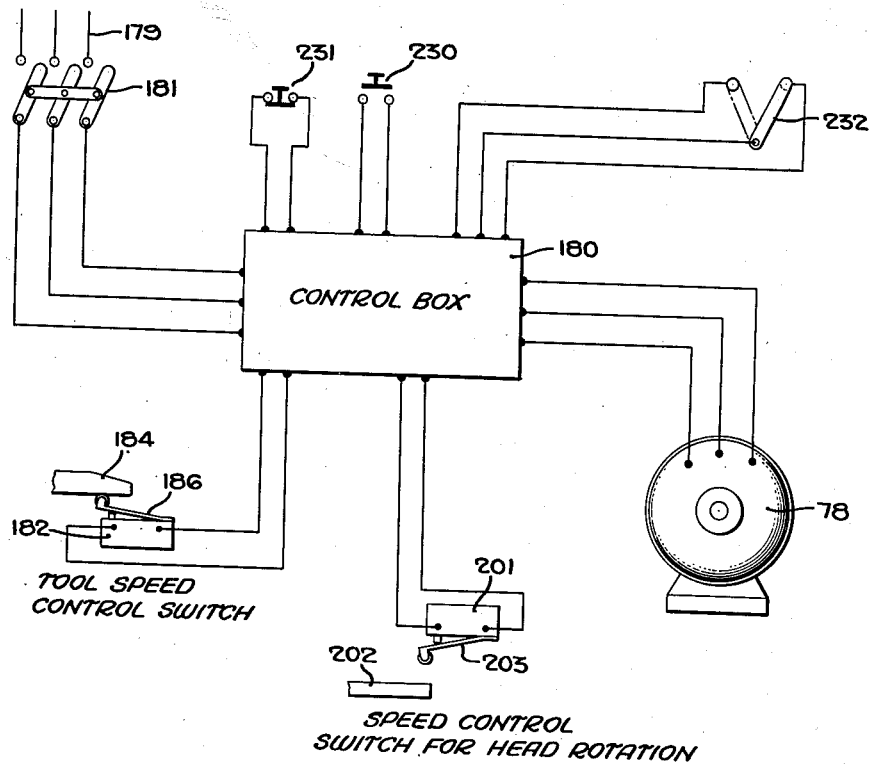

Fig. 13 is an enlarged front view of the head structure, partly broken away;

Fig. 14 is a sectional view, taken along a plane corresponding to line 14—14 of Figs. 5 and 7;

Fig. 15 is a view similar to Fig. 14, illustrating another stage in the operation of the mechanism;

Fig. 16 is a sectional view, taken along a plane corresponding to line 16—16 of Fig. 3;

Figs. 17 and 18 are fragmentary enlarged views of a part of the mechanism illustrated in Fig. 3;

Fig. 19 is a rear view of that portion of the apparatus illustrated in Figs. 17 and 18;

Fig. 20 is a sectional view, taken along a plane corresponding to line 20—20 of Fig. 3, and indicating the manner in which the head structure may be angularly adjusted;

Fig. 21 is a view similar to Fig. 20, but illustrating another phase of operation of the mechanism;

Fig. 22 is an enlarged fragmentary view, partly in section, of the mechanism for angularly adjusting the head;

Fig. 23 is a top plan view of the machine;

Fig. 24 is a fragmentary enlarged view, taken along a plane corresponding to line 24—24 of Fig. 1;

Fig. 25 is a further enlarged sectional view of a portion of the apparatus shown in Fig. 24;

Fig. 26 is an enlarged sectional view, taken along a plane corresponding to line 26—26 of Fig. 24; and Fig. 27 is a wiring diagram illustrating the control circuits for the apparatus.

As shown most clearly in Figs. 1 and 2, a standard 1 is provided carrying a work table 2. This work table 2 is provided with undercut slots 4 for facilitating the clamping of the work onto the horizontal surface 3 of the table 2. The work table 2 is furthermore vertically adjustable with respect to the standard 1, as by the aid of dovetailed guides. Clamping devices 5 are provided for maintaining the work table or holder 2 in a definite position.

Supported above the standard 1 is a housing 6 that provides the main support for the drilling mechanism. This housing 6 is hollow, and is preferably formed as a casting. Its upper end projects outwardly to extend over the table 2.

A head structure 7 (see also Figs. 3, 13, 16, and 23) is supported by the aid of the housing 6. This head structure is angularly adjustable about the axis 8, which is in this instance horizontal and parallel to the surface 3 upon which the work is supported. This head structure is arranged to accommodate a series of rotary tools 220, such as taps, drills, reamers, or the like, which are equi-angularly spaced about the axis 8. The axes of these rotary tools extend radially of the axis 8.

In order that the head structure 7 may be angularly adjusted about the axis 8, it is rotatably supported upon a slide member 9 (Figs. 2, 3, and 23). This slide member, as will be explained hereinafter, is movable vertically toward and from the work table 2. This vertical movement causes the head structure 7 to move toward and from the work. Accordingly, angular adjustment of the head 7 about its axis 8 serves to bring a desired tool, having a vertical axis extending below axis 8, into operative relation with the work on the table 2. Vertical movement of slide member 9 toward the work in a downward direction, as viewed in Figs. 1 and 2, will cause an operation to be performed; and a movement upwardly of the slide member 9 will withdraw the tool from the work.

In order to form a guide for the slide member 9, use is made of a dovetail connection between it and the housing 6. As shown most clearly in Fig. 23, one vertical edge of the slide member 9 is formed with the tapered surface 10 cooperating with an adjustable gib 11, which is accommodated in a corresponding groove in the casing 6. The other edge of member 9 may be rectangular. The manner in which the slide member 9 is moved vertically, either toward or away from the work, will be described hereinafter.

The head structure 7 includes a circular casing 12 (Figs. 2, 3, 13, 23, 24, 25 and 26) which may be provided with a flange 13 at its right-hand side. This casing 12, as shown most clearly in Figs. 3 and 13, is provided with a central boss 14 joined integrally with the right-hand wall of the casing, and is also provided with the ribs 15 extending transversely between the boss 14 and the cylindrical wall of the casing. This boss 14 is hollow and has an end wall 16. This end wall 16 serves rigidly to support a shaft 17, as by the aid of the screws 18. These screws engage a flange or collar formed integrally with the shaft 17.

The shaft 17 is rotatably supported in the bearing member 19 that is formed integrally with the slide member 9.

A cover plate 20 is attached to the left-hand end of the casing 12 and is held against a shoulder 21 formed at that end of the casing.

The head structure 7 can, accordingly, be moved angularly about the axis 8 as required by the operation of the machine. It includes a plurality of rotatable shafts or spindles, shown most clearly in Fig. 13. In the present instance, six such shafts or spindles 22 are provided, the axes of which are radial to the axis 8 and fall in a common vertical plane. The ends of these spindles are provided with threaded extensions 23 to which the chucks 24 or other tool holders may be attached.

The inner end of each spindles is supported in this instance by the aid of a radial ball bearing structure 25 supported in an appropriate recess in the boss 14. Adjacent the outer end, the spindle is supported by the aid of a radial and thrust ball bearing structure 26 supported in the outer circular wall of the casing 12. A collar 27, integral with the spindle 22, forms an abutment for the inner race of the ball bearing structure 26. This collar may be flattened to accommodate a spanner wrench when it is desired to install or remove a chuck 24. A bearing washer 26' may be appropriately fastened to the member 12 to maintain these bearings in place for each spindle.

Furthermore, each of the spindles 22 may be designed for any particular purpose, and made interchangeable in any of the positions shown.

A helical gear 28 is keyed to the shaft 22, by the aid of which the shaft 22 may be rotated. A sleeve 29 is disposed between the gear 28 and the inner ball race of ball bearing 26; and a nut 30 serves to hold the spindle assembly together.

Each of the helical gears 28 is in mesh with a driving helical gear 31 having an axis of rotation parallel to axis 8.

There is a driving gear 31 associated with each of the spindles or shafts 22. As shown most clearly in Figs. 3, 4, and 13, the driving gear 31 is mounted on a shaft or spindle 32, as by being keyed thereto. The right-hand end of the shaft or spindle 32 is supported by the thrust ball bearing structure 33 mounted in the right-hand wall of the casing 12. The left-hand end 34 of the shaft, which is of reduced diameter, is supported by the aid of the radial ball bearing structure 35 mounted in the cover plate 20.

In order to space the gear 31 properly, use is made of a spacer sleeve 36 between the inner race of the ball bearing structure 33 and the right-hand side of the gear 31. A nut 37 urges the gear 31 tightly in place.

The right-hand end of each of the shafts or spindles 32 carries a detachable driven coupling member or clutch member 37. This coupling member is arranged in the space formed to the right of the boss 14, and comprises a number of engaging teeth 38 adapted to engage with corresponding teeth in a driving coupling member to be hereinafter described.

Referring to Figs. 3 and 13, it is seen that only that coupling member 37 is in engagement with the driving coupling member 39 which serves to drive the vertical spindle 32 that extends below axis 8, and in alignment with the vertical movement of the sliding member 9. The other coupling members (see also Fig. 16) are free of engagement with the driving coupling 39 and, accordingly, only the vertical spindle which is downwardly directed from the axis 8 is in operation. The driving coupling member 39 (Figs. 3, 5 and 6) is carried by the left-hand extension 40 of a driving shaft 41. This coupling member 39 has an integral collar 42 which serves as a shift collar. This collar is splined, as by a key 43, to the extension 40 so that the coupling member 39 may be moved axially to couple and uncouple it with respect to the cooperating coupling member 37.

The shaft 41 is approximately rotatably supported by the aid of the thrust ball bearing structures 44 and 45. These ball bearing structures are mounted in the frame 46 that is attached to the slide member 9. This frame is also shown in Figs. 7 and 14. In order to fasten the frame 46 to the back of the slide 9, the slide 9 has a horizontal extension 48. Overlying the vertical face of this extension is the flange 49 extending from the frame 46, and one or more bolts 50 serve to fasten the flange to the extension 48. Similarly, a bolt 47 passes through the ear 51 fastened to the frame 46. This bolt is threaded into the slide 9. A spacer sleeve 52 holds the ear 51 spaced from the back of the sliding member 9.

Figure 6:
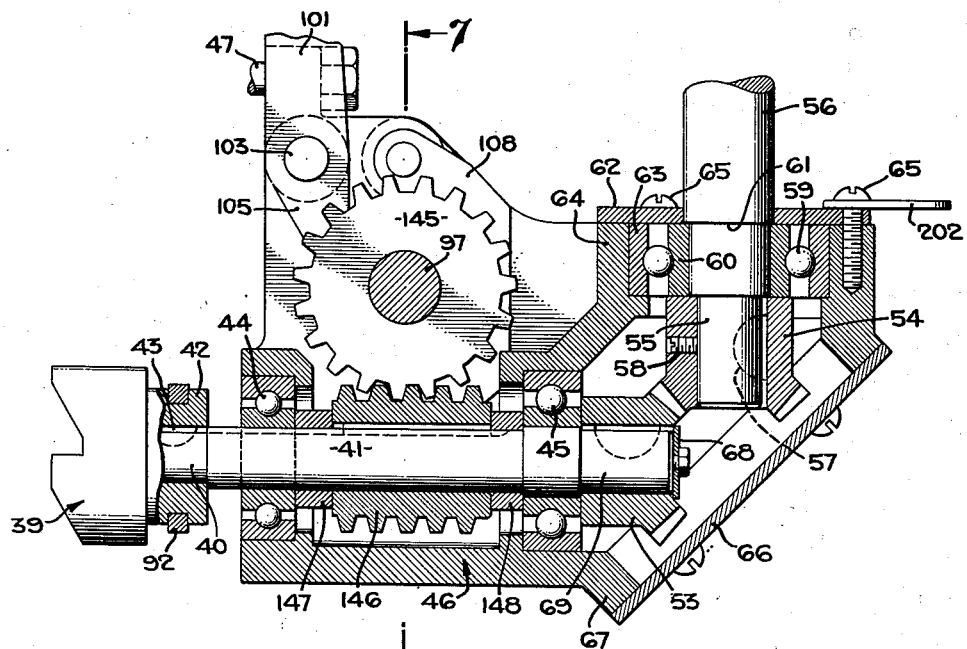
Fig. 6 is a sectional view, taken along a plane corresponding to line 6—6 of Fig. 5.

In order to drive the shaft 41, use is made of a pair of bevel gears 53 and 54 (Fig. 6). Bevel gear 53 is keyed to the right-hand end of shaft 41, and the driving bevel gear 54 is similarly keyed to the lower extension 55 of a vertical shaft 56. The gear 54 is held to the extension 55 by the aid of the key 57 and a headless set screw 58 which passes through the hub of the gear 54. A thrust ball bearing structure 59 supports the lower end of the shaft 56. The inner race 60 of this ball bearing structure has an upper surface contacting with the shoulder 61 of the shaft 56.

The outer race 63 of the ball bearing structure 59 is accommodated in a flange 64 formed on the frame 46. A cover plate 62 extends over the ball bearing structure 59 and is fastened to the flange 64, as by a number of screws 65.

A cover plate 66 is similarly fastened to a flange 67 that extends obliquely beneath the gears 53 and 54. In order to hold the gear 53 in place, a washer 68 overlying the right-hand face of the gear 53 is fastened on the right-hand extension 69 of shaft 41.

Rotary motion of shaft 56 is thus effective to rotate the driving coupling member 39 and thereby that spindle 22 which extends vertically downwardly below the axis 8.

The shaft 56, as shown most clearly in Figs. 2, 3, and 23 is splined in a top collar 70. This collar 70 is rotatably supported in a thrust ball bearing structure 71, the outer race of which is disposed in a recess 72 in the upper end of the housing 6. Due to the splined connection between the shaft 56 and collar 70, this shaft 56 can move vertically while it is being driven by the aid of either pulley 73 or 74, both of which are integral with the collar 70. Accordingly, as the slide 9 moves up and down to move the head with respect to the work, the shaft 56 is correspondingly moved.

The pulleys 73 and 74 are shown as having inclined belt engaging faces. A belt 75 is in engagement with one or the other of these pulleys. This belt is driven, as shown most clearly in Fig. 2, by the aid of one or the other of the pulleys 76 or 77 mounted on the shaft of an electric motor 78. This electric motor has a vertical axis, and its base is attached to a plate 79 mounted in the housing 6.

As will be explained hereinafter, this motor 78 can be driven at either of two speeds (high or low) in order that the proper speed may be selected for driving that spindle which is in cooperative relationship with the work.

Furthermore, the gear ratio of gears 28 and 31 can also be appropriately chosen for each spindle 32 to obtain a further choice in speed. As heretofore stated, gear 31 is rotated by the aid of the driving coupling member 39 and the driven coupling member 37.

Movement of the slide 9 in a vertical direction is effected manually by the aid of the rack and pinion mechanism shown most clearly in Figs. 1, 2, and 23.

Thus, mounted on the rear of the slide 9 is a rack 80. This rack 80 is in engagement with a pinion 81 mounted on a horizontal shaft 82 that is appropriately rotatably supported in bearings mounted on the housing 6. The shaft 82, as shown most clearly in Fig. 1, extends to the right of the machine and carries a collar 83. Radially extending from this collar 83 are a number of radial arms 84, any one of which may be grasped by the hand for rotating the shaft 82 and thereby raise and lower the slide 9. This slide 9, as heretofore stated, carries the head 7, as well as the frame 46. Accordingly, that spindle 22 which extends vertically below the axis 8 is moved to and from the work.

A cover 85 may be supported in any appropriate manner over the slide 9 and the head structure 7. This cover is cut away at the lower portion in order to expose the active spindle.

The arrangement is such that, when slide 9 is moved downwardly to perform a work operation, the head structure 7 is held against angular movement. However, when the slide 9 is urged upwardly when it is returned to its uppermost position away from the work, a mechanism is automatically operated to adjust the position of the head angularly about the axis 8 and to bring a succeeding spindle into active relation with the work. As viewed in Fig. 1, this angular adjustment is accomplished in a counter-clockwise direction; and, since there are six toolholders, each adjustment is made through an angle of sixty degrees.

In order to ensure that the head structure 7 will be locked firmly in any of its adjusted positions, use is made of an indexing pin, shown most clearly in Figs. 14 and 15. Reference may also be had to Fig. 16.

Thus, the back of the head structure of the casing 12 is provided with six recesses 86. In each of these recesses is accommodated a plug 87 of hard material in which there is a tapered recess 88. This tapered recess 88 is adapted to be engaged by the tapered end 89 of an indexing pin 90. This indexing pin 90 is axially movable in a boss or standard 91 (see, also, Fig. 3) integral with the slide 9. The manner in which the indexing pin 90 is withdrawn to the position of Fig. 15, and then allowed to return to engaging position, will be hereinafter described.

At the same time that the indexing pin 90 is withdrawn to the position of Fig. 15, the driving coupling member 39 is also withdrawn out of engagement with the corresponding driven coupling member 37. This is accomplished by the aid of a shift mechanism shown most clearly in Figs. 5, 6, 14, and 15.

Thus, the driving coupling member 39 is engaged by a shift fork 92. This shift fork is mounted on an axially movable shaft 93. This shaft, as shown most clearly in Figs. 14 and 15, is slidable in appropriate bearing standards 94 and 95 integral with the casing 46. Normally a compression spring 96 acts to urge the shaft 93 toward the left for causing engagement of the driving coupling member 39 with the driven coupling member 37. This spring 96 as its right-hand end abutting a wall formed on the bearing standard 95 and its left-hand end engages a shoulder formed on the shaft 93.

The disengagement of the indexing pin 90 and of the driving coupling 39 is effected upon urging of the slide member 9 to its uppermost position. The slide 9 carries a compression spring 9' (Figs. 1 and 23) serving as a resilient stop. This spring is supported in a recess in slide 9. It is arranged to abut arm 224 that is carried by a post 225. This post 225 is fastened into the top of frame 6. Normally, the usual force exerted on shaft 82 for moving slide member 9 upwardly is insufficient to cause the automatic angular adjustment. However, when it is desired to adjust the head, a greater force is used on shaft 82, and the spring 9' is compressed somewhat further; the slide 9 will then be in such position as to initiate the adjustment.

When this uppermost position is reached, a control shaft 97 (Figs. 6, 7, 14, and 15) is caused to rotate through a cycle (in this instance, in a counter-clockwise direction) and through a complete revolution, as viewed in Figs. 14 and 15. This shaft 97, as shown most clearly in Figs. 6, 7, 14, and 15, is journalled at its right-hand end, as viewed in Fig. 7, in a wall of the casing 46, and is similarly journalled at its left-hand end in an opposite wall of this casing.

The shaft 97 carries a multiple cam structure 98. This cam structure 98 is keyed to the shaft 97 and includes a pair of cam elements 99 and 100. In the quiescent position of Fig. 14, neither of these cam elements is operative. However, immediately upon a small angular movement in a counter-clockwise direction, cam 99 momentarily causes disengagement of the indexing pin 90 from one of the tapered holes 88 in plug 87. In order to effect this, a lever 101 is utilized having an upright arm engaging a slot 102 in the indexing pin 90. The lever 101 is pivotally mounted on a pin 103 fixed to a wall of the casing 46. When this arm is rotated in a clockwise direction about the pin 103, the indexing pin 90 is withdrawn, as illustrated in Fig. 15. A tension spring 104 (Fig. 14) serves to urge the pin 90 into indexing position.

The movement of the lever arm 101 to the releasing position of Fig. 15 is effected by the cam 99. This cam engages the arm 105 in the path of the cam 99. Shortly after the cam 99 effects withdrawal of the pin 90, the head structure 7 is rotated about its axis 8 in a manner to be hereinafter described. This permits the spring 104 to urge the pin 90 into contact with the left-hand face of the casing 12 so that the pin 90 can enter into the next tapered aperture 88 as soon as the drum structure 7 has completed its angular movement.

Similarly, cam 100 operates to shift the driving coupling member 39 to the right, as viewed in Figs. 5 and 6. This causes disengagement of the drive from that spindle 22 which projects vertically downwardly below axis 8. For this purpose the shift fork shaft 93 is provided with a slot 106. In this slot the end 107 of an arm 108 projects. This arm 108 is mounted on a pin 109 supported on the frame 46. It has a surface 110 which is vertical in the quiescent position of Fig. 14 and which is in the path of movement of the cam 100. As this cam moves in a counter-clockwise direction, the shift fork 92 is moved toward the right to the position of Fig. 15 by engagement of the cam 100 with the arm 108. The cam 100 is active for a considerable angular extent so as to retain the driving coupling member 39 in disengaged position until after the head structure 7 has been rotated to its new position.

Adjustment of the head structure 7 is also effected by rotation of the shaft 97. Thus, this shaft 97, as shown most clearly in Figs. 3, 5, and 7, carries a driving helical gear 111 at its left-hand end, as viewed in Fig. 7. This gear serves to drive a gear 112 having an axis parallel with the axis 8 and that is keyed to a shaft 113. This shaft 113 is appropriately supported for rotation in bearing standards 114' (Fig. 1) appropriately mounted upon the frame 46.

The shaft 113 is also indicated in Figs. 20, 21, and 22. It carries at its left-hand end a disc 114 that rotates in a clockwise direction, as viewed from the back of the head structure 7. The disc 114 carries a crank pin 115. Pivoted on this crank pin is a pawl member 116. This pawl member 116 may be made of a solid bar of material with an arcuate groove 117 in its left-hand edge. Extending across this slot at the upper end is a pin 118, and freely rotatable about this pin in the slot 117 is a pawl roller 119. This roller 119, as shown most clearly in Figs. 20 and 21, is intended to engage any one of the series of circular recesses 120 formed in the periphery of a ratchet wheel 121.

Ratchet wheel 121 is firmly fixed to the shaft 11 to which the head structure 7 is attached. There are as many recesses 120 as there are tool holders and equally spaced about the axis 8. In the present instance there is a spacing of sixty degrees between each of the recesses 120 so that, by rotation of the crank disc 114 through one revolution, the ratchet wheel 121 can be advanced by one-sixth of a revolution. The slot 117 serves to accommodate the left-hand portion of the ratchet wheel 121, as shown most clearly in Fig. 21. A washer 223 (Fig. 3) is interposed between the ratchet wheel 121 and the back wall of slide 9, whereby axial movement of shaft 17 is restricted.

Each of the recesses 120 is so arranged that it has an overhanging portion or tooth 122' which serves as an abutment against which the roller 119 can be urged as the crank shaft 113 rotates.

In the quiescent position shown by the full lines of Fig. 20, the pawl roller 119 rests against the outer circular periphery of the ratchet wheel 121. The pawl 116 is urged against the ratchet wheel 121 by any appropriate resilient means. In the present instance a yoke 122 extends around a collar 123 joined to the reduced extremity of shaft 17. Each end of the yoke serves as an anchor respectively for springs 124 and 125. These two springs are formed of a single piece of wire bent around a pin 126 that projects to the right of the pawl 116, as viewed in Fig. 22 and is supported thereby. This pin is supported appropriately near the upper edge of the pawl 115.

In the quiescent position indicated by the full lines of Fig. 20, the crank pin 115 is on an axis slightly below the horizontal line passing through the axis of shaft 113. Accordingly, when the crank disc 114 begins its rotation in a clockwise direction, the pin 115 is moved downwardly to move the pawl roller 119 into engagement with one of the recesses 120. As soon as the pin 115 has moved to a position corresponding to the dot-and-dash position of Fig. 20, the roller 119 is in engagement with the upper wall of a recess 120. Continued rotation then causes the pawl 116 to move the ratchet wheel in a clockwise direction. The full line position of Fig. 21 illustrates the completion of the rotary movement of the ratchet wheel 121.

Further clockwise movement of the crank disc 114 causes a disengagement of the pawl 116. This occurs by the aid of a cam member 127 attached to the shaft 17. In this instance the cam member 127 is in the form of a hexagon. The corners of the hexagon operate as cams to engage the side of the pawl 116. In this way the point of contact 128 serves as a fulcrum about which the pawl 116 is swung as the crank pin 115 moves in a clockwise direction, as viewed in Fig. 21. By the time the crank pin 115 reaches the position indicated in the dot-and-dash lines, the pawl 116 has been swung completely out of the recess 120.

The swinging of the pawl 116 out of engagement occurs at the end of the stroke, and is facilitated by the provision of the plane surfaces 129 on ratchet wheel 121, that reach transversely from the left-hand edge of the recess 120 to the periphery of the ratchet wheel 121.

The ratchet wheel 121 is moved for each revolution of the crank disc 114 through an angle of sixty degrees. A slight deviation from this angle does not affect the accurate registry of the head structure 7 with relation to the axis 8 of the head. Accurate registry is performed by the aid of the indexing pin 90, shown in Figs. 14 and 15.

Once the head structure 7 starts to move to a succeeding angular position, the cam 99 (Figs. 14 and 15) passes beyond the arm 105 and the spring 104 urges the indexing pin 90 against the right-hand surface of the casing 12. Accordingly, upon completion of the angular movement of the head structure 7, the indexing pin is urged by spring 104 into the substantially aligned recess 88 and, if necessary, gives the head structure 7 a slight angular movement to align the head structure accurately.

Often tools 220 must penetrate the work only to a required depth. Means the provided to ensure that the advance of the tool to the work is limited. The amount of advance is adjustable. Furthermore, the depth reached by each tool is also independently set.

This is accomplished by the aid of apparatus illustrated most clearly in Figs. 3, 5, 22, and 23.

The slide member 9, as shown in Figs. 3 and 23, has a horizontal flange 130 at its upper end. Rotatably mounted in an aperture 131 in this flange is a collar structure 132 having an upper flange 133 and a lower flange 134 that engages the upper and lower surfaces of the flange 130. The lower flange 134 can be detachable to facilitate assembly.

The collar 132 carries six headless adjustable screws 135 equi-distantly spaced about the axis of the collar structure 132. Each of these screws can be independently adjusted to vary the distance between the bottom of the screw and a projection 136 formed on the housing 6. This projection 136 is in the path of movement of one of the screws 135 as the slide moves downwardly. Contact of the lower end of one of the screws with the projection 136 limits the downward movement of the slide member 9.

As shown most clearly in Fig. 23, only the extreme right-hand screw 135 is in a position to be stopped by the projection 136. However, a succession of angular movements of sixty degrees of the collar 132 serves to position successive screws 135 above the projection 136.

Each of the screws 135 corresponds to a depth to be attained by a corresponding tool that has its axis below the axis 8.

The collar 132 is automatically adjustable simultaneously with the adjustment of the head structure 7. For this purpose the collar 132 is mounted on a long shaft 137. This shaft is provided with a bearing sleeve 138 (Fig. 22) formed in an arm 139. This arm 139 is shown as integral with the slide 9.

The lower end of the shaft 137 carries a helical gear 140 that meshes with a corresponding helical gear 141 mounted on the shaft 17, these gears 140 and 141 having a one-to-one ratio. Accordingly, the angular movement of collar 132 is made equal to the angular movement of shaft 17.

For each position of the head structure 7 there is a corresponding screw 135 operatively associated with the projection 136.

As heretofore stated, the operation of withdrawing the indexing pin 90 and the driving coupling member 39, and subsequent rotation of the head structure 7 is accomplished by rotating the shaft 97 (Fig. 7) through one complete revolution. The mechanism whereby this shaft proceeds through this cycle immediately upon urging of the slide 9 to its upper initial position may be best explained in connection with Figs. 3, 5, 6, 7, 8, 9, 10, 11, 12, 17, 18, and 19.

The shaft 97 has attached to it a collar 142 adjacent its left-hand end, as viewed in Fig. 7. For attaching the collar 142 to the shaft 97 use is made of a headless screw 143. It also has an annular groove 144. This collar carries one portion of a clutching mechanism for coupling the shaft 97 to a continuously rotated worm wheel 145. This worm wheel 145 is freely rotatable with respect to shaft 97, and is driven by a worm 146. This worm 146 is splined to the shaft 41, as shown most clearly in Fig. 6. Accordingly, it derives its motion from shafts 56 and 41 that are continuously rotated by the electric motor 78. The worm 146 is held in proper relation with the worm wheel 145 by the aid of the spacer collars 147 and 148.

While the clutching elements are inactive, the worm wheel 145 merely rotates freely on the shaft 97 which is held against rotation. A stop for positively holding the shaft against rotation is shown most clearly in Fig. 8, which shows a pin 149 (see, also Fig. 11). This pin 149 carries at its upper end an inclined tooth 150. The vertical face of this tooth 150 engages a shoulder 151 formed in a notch in the collar 142. The pin 149 is guided in the frame 46 for longitudinal movement, and is urged to engaging position by the aid of a compression spring 151' (Fig. 7). This compression spring abuts the lower end of the pin 149. A spring retaining projection 152 is provided at the bottom of the pin 149. The spring is held in place by the headless screw 153 threaded into a portion of the frame 46.

The clutch element carried by the collar 142 is in the form of a longitudinally movable key 154. This key, as shown most clearly in Fig. 8, has an axis of movement parallel with the axis of shaft 97. It is urged toward the right, as viewed in Fig. 7, toward engaging position by the aid of a compression spring 155. This spring 155 is appropriately located in a recess 156 (Fig. 12) formed in the key 154.

The other element of the clutch comprises a plate 157 (Figs. 7 and 10) that is held to the left-hand side of the worm wheel 145 as by the aid of the screws 158. This plate 157 may have one or more recesses or apertures 159 into which the key 154 may project to accomplish the clutching action.

In order that the proper axial relationships be maintained between the parts mounted on shaft 97, spacer washers 221 and 222 are provided.

As wheel 145 rotates, the recesses 159 are moved in succession past the key 154. So long as the key 154 is held in the restrained position of Fig. 7, no motion is transmitted from the wheel 145 to the collar 142 and shaft 97.

The key 154 is restrained against clutching movement by the aid of a pin 160 parallel to pin 149. This pin 160 is shown most clearly in Figs. 7, 9, and 12. It is guided in the frame 46 and urged upwardly by a compression spring 161, similar in construction to the compression spring 151'.

The upper end of pin 160 forms a projection 162. This projection 162 has a slanting face 163 oblique to the direction of movement of key 154. It cooperates with a corresponding oblique surface 164 forming one shoulder of a slot 165 in the bottom of key 154, in a manner to be hereinafter described. This slot 165 has an inner portion formed with parallel sides into which the projection 162 fits for restraining the key 154 in inactive position.

Withdrawal of the pin 160 permits the spring 155 to urge the key 154 into one of the recesses 159, and coupling is effected between the shaft 97 and wheel 145.

As shown most clearly in Figs. 7 and 9, the projection 162 of the pin 160 is accommodated in the groove 144. In this way, as soon as the pin 160 is pulled downwardly against the force of spring 161, the projection 162 is removed from slot 165. Subsequently the pin 160 is released, and the projection 162 then rides on the bottom of groove 144, until unclutching is again effected.

Both pins 149 and 160 are simultaneously withdrawn when the shaft 97 is to be rotated to perform the adjusting functions heretofore described. Shortly after these pins are withdrawn, the pins are allowed to move back into stopping position. The tooth 150 of pin 149 then rides on the periphery of the collar 142; and, when the collar has made a complete revolution, the tooth is effective accurately to restrain rotation beyond one revolution. At the same time, key 154, being advanced to the right to clutching position, has its oblique surface 164 in the path of oblique face 163 of pin projection 162, and these two surfaces coact to urge the key 154 to disengaging position. This disengagement thus stops the rotation of shaft 97 after a complete revolution. A slight further rotation brings the projection 162 into the parallel sided portion of slot 165. The shaft is definitely stopped after an exact revolution by the engagement of tooth 150 with shoulder 151.

To begin the cycle, the pins 149 and 160 are momentarily withdrawn as the slide member 9 is urged to its uppermost position against the stop spring 9'. For this purpose, both the pins 149 and 160 are connected to a lever 166 pivoted on a pin 167. This pin 167 is appropriately supported on the frame 46. The lever is coupled to the pin 149 by the aid of a cross pin 168 (Figs. 7, 8, and 9). The left-hand end of the pin engages the slot 169 in pin 149. It also engages a slot 160' in pin 160. Accordingly, as the arm 166 is moved in a clockwise direction, as viewed in Fig. 9, both pins 149 and 160 will be retracted and the adjusting mechanism is operated.

In order momentarily to depress the arm 166 to the desired dot-and-dash position of Fig. 8, use is made of an abutment 170. This abutment 170 is in the path of the right-hand end of the arm 166 as the slide 9 is urged to its uppermost position.

As shown most clearly in Figs. 3, 17, 18, and 19, the abutment 170 is in the form of an arm that is pivoted on a pin 171 which is stationary with respect to the apparatus. Thus, the pin 171 is mounted on a bracket 172 which is attached to a stub shaft or rod 173. This stub shaft 173 is attached at its left-hand end, as shown in Fig. 19, to a wall 174 of the main housing 6. The shaft or rod 173 passes through the bracket 172, and a set screw 175 is provided to hold the bracket firmly on the rod 173. Compression spring 176, accommodated in a recess in the bracket 172, urges the abutment arm 170 toward engaging position.

Accordingly, when the slide member 9 moves upwardly, the right-hand end of the arm 166 contacts the end of the abutment arm 170. Further upward movement of the slide 9, compressing spring 9', is effective to withdraw the pins 149 and 160, since the arm 166 is held against further movement by the abutment arm 170.

It is, however, desirable to release arm 166 shortly after the adjustment mechanisms are actuated and thereby to cause the pins 149 and 160 to be urged into operative relation with the collar 142.

For this purpose, the shaft 113 which rotates the crank disc 114 (Fig. 5) has, at its right-hand end, a resetting arm 177, shown most clearly in Figs. 17, 18, and 19. In the inactive position, this reset arm is vertical, as shown in Fig. 19. However, after shaft 113 has moved through about ninety degrees, corresponding to the beginning of the movement of the crank disc 114, this arm approaches the horizontal position indicated in the dot-and-dash lines of Fig. 19. The arm contacts a roller 178 mounted on the abutment arm 170. It moves the roller, accordingly, toward the right, as viewed in Fig. 18, and releases the arm 166 from the abutment 170. Accordingly, the clutch control pin 160, as well as the indexing pin 149, are released and are in proper position to stop the rotation of shaft 97 after it has made one complete revolution.

Accordingly, as soon as the slide member 9 is in its uppermost position, the controlling acts performed by shaft 97 occur in proper sequence to release the head structure 7, to withdraw the driving coupling member 39, and to operate the pawl and ratchet mechanism for angularly adjusting the head. Upon conclusion of this adjustment, the shaft 97 is stopped. Then the slide member 9 may be moved downwardly by the hand mechanism 82, 83, and 84 to operate on the work. Upon conclusion of the operation, the slide member 9 can again be moved upwardly, and a new adjustment of the head structure 7 is effected to bring the tools successively into operative position.

The electric motor 78, shown in Fig. 2, has control circuits such that its speed may be adjusted to conform with the requirements of the tool that is in operative position. This is shown diagrammatically in Fig. 27. In this figure the incoming mains 179 serve to supply power to the motor 78 through a control mechanism indicated diagrammatically by the rectangle 180. The main switch 181 serves to deenergize the system as required. A small switch mechanism 182 is indicated in the diagram of Fig. 27 for controlling the speed of the motor between a high and low speed. This may be in the form of a microswitch. It serves to control the speed of the tool that is in operative position. When the switch 182 is open, the motor 78 may have a high speed of rotation; and, when it is closed, it may have a low speed of rotation.

The switch 182 is arranged to be automatically controlled by a cam arrangement mounted on the head structure 7. Thus, as shown most clearly in Fig. 24, this switch mechanism 182 (Figs. 23 and 24) is shown as mounted on the main housing 6. A cover 183 in Fig. 23 extends over the switch.

The switch 182 is arranged to be operated by the aid of a lever 184 pivoted in ears 185 extending along the side of the casing 6. The right-hand end of the lever is arranged to depress the spring arm 186 that operates the switch 182 when the lever 184 is rotated about its pivot formed by a pin 187. A leaf spring 188 urges the arm 184 outwardly with respect to the switch 182 so as to leave the switch in one of its two controlling positions.

The left-hand end of the arm 184, as shown in Fig. 24, carries a cam follower roller 189. This cam follower roller is arranged to be actuated by a cam 190 mounted radially of the axis 8 and carried by the casing 12 of head 7. There are as many of the cams 190 as there are spindles 22. They are, furthermore, so positioned that one of the cam followers 190 may be placed in active position with the arm 188 when the head structure 7 is in any one of its adjusted positions. The switch station in Fig. 13 corresponds to the right-hand side of the drum structure 7. Accordingly, that particular cam 190 which is in active position with respect to the arm 184 determines the speed of the motor 78, driving the active spindle 22.

Each of the cam structures 190 can be either placed into or out of cooperative position with respect to the roller 189. In this way, the switch 182 is either actuated or left unactuated, corresponding to the two speeds of motor 78.

For aligning the cam 190 in either active or inactive position, the cam is mounted on a slide plate 191 (Figs. 25 and 26). This slide plate can be urged in a direction parallel with the axis 8 by the aid of a knob 192. This knob has a narrow neck 193 passing between the flanges 194 and 195 of the guide for the slide 190. In the full line position of Fig. 25, the cam 190 is is in switch operating position. In the dot-and dash position, the cam 190 has been moved toward the left and out of cooperative relationship with the cam roller 189.

In order to retain the slide 191 in either of its two positions, a ball restraint mechanism is used and is illustrated in Fig. 25. Thus, the slide 191 is provided with a pair of spaced concavities 196 and 197 capable of receiving the ball restraint 198. This ball restraint is accommodated in a recess 199 in the casing 12. A compression spring 200 in the recess urges the ball into engagement with either of the two recesses 196 and 197.

As the head structure 7 is adjusted to any one of its angular positions in succession, a different cam member 190 may be brought into operative position with respect to the arm 184. Accordingly, the speed of the active spindle can be thereby determined. For each position of the head structure 7, there is a cam which comes into play for determining this speed.

In order to make the speed of adjustment act at the desired rate, the arrangement is such that the motor 78 is adjusted just prior to the time when the head 7 is rotated. For this purpose, another switch mechanism 201 (Figs. 3 and 27) is provided which is actuated when the slide member 9 returns to its extreme upper position. This switch member is operated by an arm 202 attached to the cover member 62. As the cover member moves up with the slide member 9, it contacts the operating arm 203 and causes the speed of the motor to be adjusted to a desired value.

A start button 230 and a stop button 231 may be appropriately supported on standard 1, and are shown in Fig. 27.

The adjustment of head 7 is preferably performed at a relatively fast rate of the order of one second. When the motor 78 is operating on the larger pulley 73, the switch mechanism 201 merely causes the motor to operate at high speed. However, when the motor drives the smaller pulley 74, the speed of adjustment would be too great. Accordingly, a manually operated switch 232 mounted on head 6 may be used to condition the motor circuits in conjunction with switch mechanism 201 to produce optionally a high speed when the smaller pulley 74 is active, or a low speed when the larger pulley 73 is active. This switch 231 may thus be operated to control the speed of adjustment.

The mode of operation of the mechanism may be briefly summarized. During normal operation the coupling member 39 is in driving relation with the coupling member 37 that drives a spindle 22 (Figs. 3 and 13). On the completion of the drilling or reaming operation, the slide member 9 is moved upwardly. In moving upwardly the arm 179 is contacted by the arm 166, and the switch 201 is also operated. The speed of the motor is thereby increased at the same time the shaft 97 (Fig. 7) is clutched to the wheel 145 that is continuously driven. This shaft 97 makes one complete revolution and then stops. The cams 99 and 100 (Figs. 14 and 15) are actuated promptly upon motion of shaft 97, to release the indexing pin 90 and to withdraw coupling member 39. The crank disc 114 is also operated by the motion of shaft 97 through the shaft 113, and the head is adjusted to a succeeding position by the ratchet mechanism shown in Figs. 20, 21, and 22. The cam 100 subsequently returns to inactive position and the coupling 39 is then moved into driving engagement with the corresponding coupling 37. At the same time, the indexing pin 90 snaps into position in one of the recesses 88 in the head casing 12. A succeeding tool operation can now be performed.

As soon as head structure 7 assumes a new adjusted position, the switch 182 is controlled in such a way as to choose the proper speed of operation for the active spindle. The speed of the spindle can also be varied, as heretofore stated, by appropriate choice of the ratio of the drive gears 28 and 31.

The one-revolution clutch structure and its trip mechanism, as illustrated in Figs. 7 to 11, inclusive, are made the subject matter of an application filed on March 14, 1952, in the name of Fred G. Burg, Ser. No. 276,622, and entitled Cyclically Operable Power Transmission Mechanism.

The speed control system exemplified by the structure illustrated in Figs. 23, 24, 25, and 26 is described and claimed in an application Ser. No. 276,755, filed March 15, 1952, under the name of Fred G. Burg, and entitled Speed Control System for Machine Tools.

The inventor claims:

1. In a machine tool adapted to perform operations on work by the aid of rotary tools: an angularly adjustable head having a plurality of angularly spaced tool holders about the axis of the head; said axis being normal to the axes of the tool holders; means restraining said head along the axis of said rotation; coupling members respectively associated with each tool holder for driving it; driving means having a coupling member positioned for engagement with that one of the tool holder coupling members that has its axis aligned with the driving coupling member; means for moving the head toward and from the work; and means responsive to the movement of the head away from the work toward an initial position for disengaging the driving coupling member, then angularly adjusting the head about its axis to position a succeeding tool holder into operative relation to the work and the driving means, and then reengaging said driving coupling member, comprising a power driven actuator mechanism for intermittently supplying power to the head adjusting means; and a trip device to initiate operation of said actuator mechanism, comprising a restraint normally maintaining said actuator mechanism inactive; an abutment with which the head is relatively movable as the head is brought toward and from the work; and means movable with the head, and contacting said abutment when the head is moved from the work to an initial position, to render said restraint ineffective.

2. In a machine tool adapted to perform operations on work by the aid of rotary tools: an angularly adjustable head having a plurality of angularly spaced tool holders about the axis of the head; coupling members respectively associated with each tool holder for driving it; driving means having a coupling member positioned for engagement with one of the tool holders coupling members that has its axis aligned with the driving coupling member; means for moving the head toward and from the work; mechanism for angularly moving the head; mechanism for disengaging the driving coupling member; said mechanisms being inactive during operation of the tool on the work; a transmission having a continuously rotating shaft for operating said mechanisms; a trip mechanism operated by the movement of the head away from the work toward an initial position and power means energized by said trip mechanism for imparting a unit of angular motion from said shaft to said mechanisms; said trip mechanism comprising a restraint normally maintaining said actuator mechanism inactive; an abutment with which the head is relatively movable as the head is brought toward and from the work; and means movable with the head, and contacting said abutment when the head is moved from the work to an initial position, to render said restraint ineffective.

3. In a machine tool adapted to perform operations on work by the aid of rotary tools: an angularly adjustable head having a plurality of angularly spaced tool holders about the axis of the head; coupling members respectively associated with each tool holder for driving it; said coupling members being carried by the head; driving means having a coupling member movable with respect to the head and positioned for engagement with that one of the tool holder coupling members that has its axis aligned with the driving coupling member; means for moving the head toward and from the work; a trip mechanism operated by the movement of the head away from the work toward an initial position; power means energized by said trip mechanism for disengaging the driving coupling member, then angularly adjusting the head about its axis to position a succeeding tool holder into operative relation to the work and the driving means, and then reengaging said driving coupling member; a spring-pressed pin indexing the head and locking the head against adjustment; and means operating in synchronism with the adjusting means for moving the pin out of locking position and then releasing the pin to permit it to relock the head on conclusion of the adjusting operation; said trip mechanism comprising a restraint normally maintaining said actuator mechanism inactive; an abutment with which the head is relatively movable as the head is brought toward and from the work; and means movable with the head, and contacting said abutment when the head is moved from the work to an initial position, to render said restrain ineffective.

4. In a machine tool adapted to perform operations on work by the aid of rotary tools: a head having a plurality of spaced tool holders and adjustable to bring a selected tool into operative relation to the work; means for moving the head toward and from the work; a driving mechanism for the selected tool; a coupling means carried by each tool holder for the driving mechanism; a cooperating coupling means carried by the driving mechanism and serving to connect the selected tool and the driving mechanism; a cam for moving the driving coupling member out of engagement with the tool holder coupling member; a driver for the cam; a clutch means urged to engagement for coupling the cam driver to the cam; means holding the clutch means out of engagement; means responsive to the return of the head toward an initial position away from the work for moving the holding means so as to permit the clutching means to engage; and means operated by movement of the cam for conditioning said holding means to render it effective to disengage the clutch upon predetermined angular movement of the cam.

5. In a machine tool adapted to perform operations on work by the aid of rotary tools: a head having a plurality of spaced tool holders and adjustable to bring a selected tool into operative relation to the work; means for moving the head toward and from the work; a driving mechanism for the selected tool; a coupling means carried by each tool holder for the driving mechanism; a cooperating coupling means carried by the driving mechanism and serving to connect the selected tool and the driving mechanism; a mechanism capable of performing repeated cycles for intermittently adjusting the head; a cam for moving the driving coupling member out of engagement with the tool holder coupling member; a driver for the cam and for the head adjusting means; a clutch means urged to engagement for coupling the cam driver to the cam; means holding the clutch means out of engagement; means responsive to the return of the head to an initial position away from the work for moving the holding means for permitting the clutching means to engage; and means operated by movement of the driver for conditioning said holding means to render it effective to disengage the clutch upon predetermined angular movement of the driver.

6. In a machine tool adapted to perform operations on work by the aid of rotary tools: a head adjustable about an axis and having a plurality of tool holders having axes radial to the axis of the head, said tool holders being uniformly axially spaced; means forming a guide for the head to permit the head to move toward and from the work in a direction transverse to the head axis; one of the tool axes being aligned with the direction of movement of the head with respect to its guide; means for moving the head with respect to the guide; a drive mechanism movable with the head for operating a tool holder the axis of which holder is aligned with the movement of the head with respect to its guide; means movable along with the head with respect to its guide for unclutching the drive mechanism; means movable along with the head for angularly adjusting the head about its axis by uniform increments corresponding to the angular spacing of the tool holder axes; a transmission for operating both the unclutching means and angular adjusting means; said transmission having an axis about which at least a portion of the transmission is rotatable; and means responsive to movement of the head away from the work toward an initial position for connecting the transmission mechanism to the unclutching means and the angular adjusting means through a cycle to bring a succeeding tool holder into operative position with respect to the work and to cause reengagement of the clutching means after the head is angularly adjusted, comprising a restraint normally maintaining said transmission mechanism inactive; an abutment with which the head is relatively movable as the head is brought toward and from the work; and means movable with the head, and contacting the said abutment when the head is moved from the work to an initial position, to render said restraint ineffective.

7. In a machine tool adapted to perform operations on work by the aid of rotary tools: a head adjustable about an axis and having a plurality of tool holders having axes radial to the axis of the head, said tool holders being uniformly axially spaced; means forming a guide for the head to permit the head to move toward and from the work in a direction transverse to the head axis; one of the tool axes being aligned with the direction of movement of the head with respect to its guide; means for moving the head with respect to the guide; a drive mechanism movable with the head for operating a tool holder the axis of which holder is aligned with the movement of the head with respect to its guide; means movable along with the head with respect to its guide for unclutching the drive mechanism; means movable along with the head for angularly adjusting the head about its axis by uniform increments corresponding to the angular spacing of the tool holder axes; a transmission for operating both the unclutching means and angular adjusting means; said transmission having an axis about which at least a portion of the transmission is rotatable; and means responsive to movement of the head away from the work toward an initial position for connecting the transmission mechanism to the unclutching means and the angular adjusting means through a cycle to bring a succeeding tool holder into operative position with respect to the work and to cause reengagement of the clutching means after the head is angularly adjusted; comprising a key longitudinally movable in a direction parallel to the axis of transmission for rendering the transmission effective; said key when active to render the transmission effective, being rotated about the transmission axis, and not rotated when the key is inactive; a dog restraining said key, said dog having a surface inclined to the transmission axis, and the key having a correspondingly inclined surface connecting with a surface normal to the transmission axis; resilient means urging said dog toward engaging position of the key and the dog; means toward which the head moves when it is being retracted from the work, for causing the dog to recede from the key, and for rendering the transmission effective; and means effective upon initiation of the drive of the angular adjusting means and the unclutching means for releasing the dog, said inclined surfaces being thus effective after a cycle to withdraw the key to disconnect the clutch.

8. In a machine tool adapted to perform operations on work by the aid of rotary tools: a head adjustable about an axis and having a plurality of tool holders having axes radial to the axis of the head, said tool holders being uniformly axially spaced; means forming a guide for the head to permit the head to move toward and from the work in a direction transverse to the head axis; one of the tool axes being aligned with the direction of movement of the head with respect to its guide; means for moving the head with respect to the guide; a drive mechanism movable with the head for operating a tool holder the axis of which holder is aligned with the movement of the head with respect to its guide; means movable along with the head with respect to its guide for unclutching the drive mechanism; means movable along with the head for angularly adjusting the head about its axis by uniform increments corresponding to the angular spacing of the tool holder axes; a transmission for operating both the unclutching means and angular adjusting means; said transmission having an axis about which at least a portion of the transmission is rotatable; and means responsive to movement of the head away from the work toward an initial position for connecting the transmission mechanism to the unclutching means and the angular adjusting means through a cycle to bring a succeeding tool holder into operative position with respect to the work and to cause reengagement of the clutching means after the head is angularly adjusted; comprising a key longitudinally movable in a direction parallel to the axis of transmission for rendering the transmission effective; said key when active to render the transmission effective, being rotated about the transmission axis, and not rotated when the key is inactive; a dog restraining said key, said dog and key having surfaces inclined to the transmission axis; resilient means urging said dog toward engaging position; means toward which the head moves when it is being retracted from the work, for causing the dog to recede from the key, and for rendering the transmission effective; means effective upon initiation of the drive of the angular adjusting means and the unclutching means for releasing the dog, said inclined surfaces being thus effective after a cycle to withdraw the key; and means operative with the dog for ensuring that the cycle during which the transmission is effective terminates at a precise point of movement of the angular adjusting means and the unclutching means.

9. In a machine tool adapted to perform operations on work by the aid of rotary tools: an adjustable head having a plurality of spaced tool holders; a source of motion for driving the tools; means forming a detachable coupling from the source of motion to a selected tool holder; a power driven transmission mechanism for adjusting the head and including a clutch having separable parts; means restraining one of said parts; means for moving the head toward and from the work; means responsive to movement of the head away from the work toward an initial position for removing said restraining means; and means responsive to the initiation of the adjustment for moving the restraining means to a position in which the clutch parts are caused to be separated upon a definite extent of movement of the transmission.

10. In a machine tool adapted to perform operations on work by the aid of rotary tools: an adjustable head having a plurality of spaced tool holders; a source of motion for driving the tools; means forming a detachable coupling from the source of motion to a selected tool holder; a power driven transmission mechanism for adjusting the head and including a clutch having separable parts; means controlling one of the clutch parts and movable between a position in which said clutch part is restrained against clutching engagement and another position permitting the clutch part to move into engagement; movable stop means for precisely limiting the extent of movement of the transmission mechanism; means for moving the head toward and from the work; means responsive to movement of the head away from the work toward an initial position for moving the control means out of restraining position and for moving the stop means to free the transmission; and means responsive to the initiation of the adjustment for moving the means responsive to movement of the head to ineffective position to release the controlling means and the stop means so that they may become effective upon completion of the adjustment to unclutch the clutch and to limit the adjustment.

11. In a machine tool adapted to perform operations on work by the aid of rotary tools: an adjustable head having a plurality of spaced tool holders; a source of motion for driving the tools; means forming a detachable coupling from the source of motion to a selected tool holder; a transmission mechanism for adjusting the head and including a clutch having separable parts; one of said parts being slidable into and out of engagement with the other part, and being nonrotating when the clutch parts are disengaged, and rotating with the transmission when the clutch parts are engaged; means resiliently urging said one of the parts toward engaging position; means movable transversely of the said part for restraining movement of said part; means urging said restraining means to restraining position; means for moving the head toward and from the work; means responsive to the movement of the head away from the work toward an initial position for overcoming said urging means to free the clutch part; and means responsive to the initiation of the adjustment for releasing said urging means; said transversely movable part and the clutch part having cooperating surfaces to cause the clutch part to be moved out of clutching engagement when the transmission has moved through a definite angle.

12. In a machine tool adapted to perform operations on work by the aid of rotary tools: an adjustable head having a plurality of spaced tool holders; a source of motion for driving the tools; means forming a detachable coupling from the source of motion to a selected tool holder; a transmission mechanism for adjusting the head and including a clutch having separable parts; one of said parts being a bolt movable in a direction parallel to the axis of the clutch and non-rotary until it engages the other part of the clutch; a spring urging said bolt toward engaging position; means movable relative to the bolt in a direction radial of the axis of the clutch for holding the bolt out of engagement; a second spring for urging the said holding means toward holding position; means for causing movement of the holding means away from the holding position and against the force of said second spring; and means releasing said movement causing means; said bolt and the holding means having cooperating surfaces such that when the bolt approaches its beginning position after the clutch parts are in engagement, said bolt is retracted by the holding means to disengaged position.

13. In a machine tool adapted to perform operations on work by the aid of rotary tools: an adjustable head having a plurality of spaced tool holders; a source of motion for driving the tools; means forming a detachable coupling from the source of motion to a selected tool holder; a transmission mechanism for adjusting the head and including a clutch having separable parts; one of said parts being a bolt movable in a direction parallel to the axis of the clutch and non-rotary until it engages the other part of the clutch; a spring urging said bolt toward engaging position; means movable relative to the bolt in a direction radial of the axis of the clutch for holding the bolt out of engagement; a second spring for urging the said holding means toward holding position; means for causing movement of the holding means away from the holding position and against the force of said second spring; means releasing said movement causing means; said bolt and the holding means having cooperating surfaces such that when the bolt approaches its beginning position after the clutch parts are in engagement, said bolt is retracted by the holding means to disengaged position; and stop means joined to the holding means for precisely limiting movement of the transmission.

14. In a machine tool adapted to perform operations on work by the aid of rotary tools: a head having means for holding a plurality of rotary tools; means for moving the head toward and from the work; a shaft; means operated by the shaft for adjusting the head in step-by-step manner after an operation by a tool is performed; a continuously rotating member on the shaft; a first clutch part connected to the member and having one or more recesses spaced from the axis of the shaft; a cooperating bolt adapted to engage one of the recesses and movable parallel to the axis of the shaft; said bolt being carried by the shaft; a spring urging the bolt toward engaging position to cause clutching of the shaft to the member; a dog radially movable with respect to the shaft axis and adapted to engage the bolt to restrain the bolt from engaging movement; a second spring urging the dog toward restraining position; and arm connected to the dog; a member for engaging the arm to move the dog out of restraining position against the force of the second spring; means responsive to the movement of the head from the work toward an initial position for operating the said arm engaging member to initiate rotation of the shaft by moving the dog; and means movable by the shaft after the shaft is clutched to the rotating member for moving the arm engaging member to release the dog; said dog and bolt having cooperating surfaces to move the bolt to disengaging position when the shaft moves through a complete revolution.

15. In a machine tool adapted to perform operations on work by the aid of rotary tools: a head having means for holding a plurality of rotary tools; means for moving the head toward and from the work; a shaft; means operated by the shaft for adjusting the head in step-by-step manner after an operation by a tool is performed; a continuously rotating member on the shaft; a first clutch part connected to the member and having one or more recesses spaced from the axis of the shaft; a cooperating bolt adapted to engage one of the recesses and movable parallel to the axis of the shaft; said bolt being carried by the shaft; a spring urging the bolt toward engaging position to cause clutching of the shaft to the member; a dog radially movable with respect to the shaft axis and adapted to engage the bolt to restrain the bolt from engaging movement; a second spring urging the dog toward restraining position; an arm connected to the dog; a member for engaging the arm to move the dog out of restraining position against the force of the second spring; means responsive to the movement of the head from the work toward an initial position for operating the said arm engaging member to initiate rotation of the shaft by moving the dog; means movable by the shaft after the shaft is clutched to the rotating member for moving the arm engaging member to release the dog; said dog and bolt having cooperating surfaces to move the bolt to disengaging position when the shaft moves through a complete revolution; and stop means for precisely limiting the movement of the shaft, said stop means being connected to the dog for simultaneous operation therewith.

16. In a machine tool adapted to perform operations on work by the aid of rotary tools: a head having means for holding a plurality of rotary tools; means for moving the head toward and from the work; a shaft; means operated by the shaft for adjusting the head in step-by-step manner after an operation by a tool is performed; a continuously rotating member on the shaft; a first clutch part connected to the member and rotating therewith; a collar mounted on the shaft; said collar having an annular groove; a second clutch part slidably supported by the collar for movement in a direction parallel to the axis of the shaft for engagement and disengagement with the first clutch part; said second clutch part traversing said groove; means urging said second clutch part toward engaging position; said clutch parts when engaged causing rotation of said shaft; means for restraining the second clutch part against the force of said urging means, said restraining means having an operating portion extending into the groove; means responsive to the movement of the head toward an initial position away from the work for freeing the second clutch part; and means operated upon initiation of the head adjusting movement for releasing the restraining means; said restraining means then contacting the inner wall of the groove; said restraining means and the second clutch part having cooperating surfaces to move the second clutch part out of engaging position when the shaft completes a revolution.

17. In a machine tool adapted to perform operations on work by the aid of rotary tools: a head having means for holding a plurality of rotary tools; means for moving the head toward and from the work; a shaft; means operated by the shaft for adjusting the head in step-by-step manner after an operation by a tool is performed; a continuously rotating member on the shaft; a first clutch part connected to the member and rotating therewith; a collar mounted on the shaft; said collar having an annular groove; a second clutch part slidably supported by the collar for movement in a direction parallel to the axis of the shaft for engagement and disengagement with the first clutch part; said second clutch part traversing said groove; means urging said second clutch part toward engaging position; said clutch parts when engaged causing rotation of said shaft; means for restraining the second clutch part against the force of said urging means, said restraining means having an operating portion extending into the groove; means responsive to the movement of the head toward an initial position away from the work for freeing the second clutch part; means operated upon initiation of the head adjusting movement for releasing the restraining means; said restraining means then contacting the inner wall of the groove; said restraining means and the second clutch part having cooperating surfaces to move the second clutch part out of engaging position when the shaft completes a revolution; stop means cooperating with an abutment on the collar for precisely determining the angular motion of the shaft; and means connecting said stop means with the restraining means for simultaneous operation therewith.

18. In a machine tool adapted to perform operations on work by the aid of rotary tools: a head adjustable about an axis and having means for holding a plurality of rotary tools so that the axes extend radially about said head axis; means for adjusting the angular position of the head for selecting one of the rotary tools for operating on the work; a rotary coupling mechanism for transmitting rotary power to the tool holding means, including a driving coupling member, and a plurality of driven coupling members respectively connected to the tool holding means, the axis of the rotary coupling mechanism being normal to the tool axes; means for moving the head in a direction transverse to its axis, and toward and from the work; means for angularly moving the head; a common rotary transmission mechanism for moving the driving coupling member to disengaged position and for operating the angularly moving means; and means responsive to a sufficient movement of the head for actuating the transmission mechanism through a cycle of operation.

19. In a machine tool adapted to perform operations on work by the aid of rotary tools: a head adjustable about an axis and having means for holding a plurality of rotary tools so that the axes extend radially about said head axis; means for adjusting the angular position of the head for selecting one of the rotary tools for operating on the work; a rotary coupling mechanism for transmitting rotary power to the tool holding means, including a driving coupling member, and a plurality of driven coupling members respectively connected to the tool holding means, the axis of the rotary coupling mechanism being normal to the tool axes; means for moving the head in a direction transverse to its axis, and toward and from the work; means for angularly moving the head; a common rotary transmission mechanism for moving the driving coupling member to disengaged position and for operating the angularly moving means; said transmission mechanism including a device which, when moved and released, causes the transmission mechanism to operate through a definite angular movement; an abutment for moving said device relative to the transmission mechanism when the head is retracted from the work; and means for moving the abutment out of the path of the device in response to operation of the transmission mechanism.

FRED G. BURG.

References Cited in the file of this patent

UNITED STATES PATENTS

| Number | Name | Date |
|---|---|---|
| 312,019 | Salisbury | Feb. 10, 1885 |
| 694,783 | Quint | Mar. 4, 1902 |
| 1,168,091 | Maughmer | Jan. 11, 1916 |
| 1,288,351 | Wood | Dec. 17, 1918 |
| 1,924,383 | Stampfli | Aug. 29, 1933 |
| 2,004,794 | Munschauer | June 11, 1935 |
| 2,303,243 | Trythall | Nov. 24, 1942 |
| 2,325,102 | Boschen | July 27, 1943 |